(12) United States Patent
Jahn et al.

(10) Patent No.: US 7,783,388 B2
(45) Date of Patent: Aug. 24, 2010

(54) ACTUATOR WITH MEMORY PART FOR BUILDING MANAGEMENT SYSTEM

(75) Inventors: Gerhard Jahn, Lochau (AT); Josef Fa, Dornbirn (AT)

(73) Assignee: Zumtobel Lighting GmbH (AT)

( * ) Notice: Subject to any disclaimer, the term of this patent is extended or adjusted under 35 U.S.C. 154(b) by 821 days.

(21) Appl. No.: 11/563,342

(22) PCT Filed: May 27, 2005

(86) PCT No.: PCT/EP2005/005723

§ 371 (c)(1),
(2), (4) Date: Jan. 19, 2007

(87) PCT Pub. No.: WO2005/117503

PCT Pub. Date: Dec. 8, 2005

(65) Prior Publication Data

US 2009/0112366 A1    Apr. 30, 2009

(30) Foreign Application Priority Data

May 28, 2004 (DE) .................. 10 2004 026 178
Aug. 16, 2004 (DE) .................. 10 2004 039 677

(51) Int. Cl.
| | |
|---|---|
| G05B 21/00 | (2006.01) |
| G05B 23/00 | (2006.01) |
| G05B 15/00 | (2006.01) |
| G01M 1/38 | (2006.01) |
| G05D 23/00 | (2006.01) |
| G05B 15/02 | (2006.01) |
| G05B 19/18 | (2006.01) |
| G05B 11/01 | (2006.01) |
| G05B 23/02 | (2006.01) |
| G09G 1/28 | (2006.01) |
| G09G 1/04 | (2006.01) |
| H01J 25/50 | (2006.01) |

(52) U.S. Cl. .................. 700/275; 700/9; 700/10; 700/19; 700/276; 700/277

(58) Field of Classification Search .............. 700/9–10, 700/19, 275–277; 709/242–244; 340/3.1, 340/3.3–3.32; 315/39.59, 368.12, 307
See application file for complete search history.

(56) References Cited

U.S. PATENT DOCUMENTS 5,570,085 A * 10/1996 Bertsch .............. 340/3.54

(Continued)

FOREIGN PATENT DOCUMENTS

DE    19611161 A1    9/1997

(Continued)

OTHER PUBLICATIONS

English translation of the International Preliminary Examination Report for PCT/EP2005/00572, mailed on Feb. 8, 2007.

(Continued)

*Primary Examiner*—Ramesh B Patel
(74) *Attorney, Agent, or Firm*—The H.T. Than Law Group

(57) ABSTRACT

A building management system (1) for the control of plural actuators (10) arranged in a distributed manner, comprised of a central control unit (2) and at least one actuator (10) controlled by the central control unit (2), wherein the actuator (10) has a control device (11) which is formed to receive control commands from the central control unit (2) and to operate the actuator (10) in dependence upon these control commands, and a memory part (13) for storing function-relevant information. In accordance with the invention the memory part (13) is separate or separable from the control device (11).

27 Claims, 3 Drawing Sheets

U.S. PATENT DOCUMENTS

| | | | |
|---|---|---|---|
| 5,572,438 A * | 11/1996 | Ehlers et al. | 700/295 |
| 6,118,230 A | 9/2000 | Fleischmann | |
| 6,118,231 A * | 9/2000 | Geiginger et al. | 315/312 |
| 6,374,079 B1 * | 4/2002 | Hsu | 455/11.1 |
| 6,441,565 B1 | 8/2002 | Levy | |
| 6,546,435 B1 * | 4/2003 | Yoshimura et al. | 710/4 |
| 6,693,397 B2 | 2/2004 | Handa | |
| 6,856,236 B2 * | 2/2005 | Christensen et al. | 340/3.5 |
| 6,914,893 B2 * | 7/2005 | Petite | 370/338 |
| 6,980,080 B2 * | 12/2005 | Christensen et al. | 340/3.5 |
| 7,548,833 B2 * | 6/2009 | Ahmed | 702/188 |
| 2003/0227267 A1 | 12/2003 | Yen | |
| 2004/0100396 A1 | 5/2004 | Antico | |
| 2005/0035854 A1 * | 2/2005 | Gupta et al. | 340/531 |
| 2006/0259199 A1 * | 11/2006 | Gjerde et al. | 700/284 |

FOREIGN PATENT DOCUMENTS

| | | |
|---|---|---|
| DE | 29906702 U1 | 9/2000 |
| DE | 20100654 U1 | 4/2001 |
| EP | 0966183 A1 | 12/1999 |
| EP | 1435678 A2 | 7/2004 |
| FR | 2743866 | 1/1996 |
| WO | 0043966 | 6/2000 |

OTHER PUBLICATIONS

Luger, Siegfried and Hein, Peter F. "Beleuchtung Wird Busfahig," 2087 Elektronik, 41 Dec. 22, 1992, No. 26, Munchen, DE. Document XP000327405, ISSN: 0013-5658.

International Search Report as issued by the European Patent Office on Aug. 26, 2005 in connection with PCT/EP2005/005723.

International Preliminary Examination Report as issued by the European Patent Office on May 22, 2006 in connection with PCT/EP2005/005723.

* cited by examiner

ACTUATOR WITH MEMORY PART FOR BUILDING MANAGEMENT SYSTEM

FIELD OF THE INVENTION

The present invention relates to a building management system for the control of a plurality of actuators arranged in the distributed manner, and an actuator which is provided for employment in a corresponding building management system and has a memory part for storing function-relevant information. In particular the present invention relates to an illumination system having a central control unit for the control of a plurality of luminaires arranged in a distributed manner, and a corresponding luminaire.

BACKGROUND OF THE INVENTION

Electronic ballasts for operating lamps, in particular gas discharge lamps, are usually so configured that they can be employed for the control of different lamp types and can be put to use in different luminaire types. Correspondingly, electronic ballasts are produced in very great numbers and at the end of their production process are installed in a luminaire, so that the mechanism of the luminaire and the electronics, i.e. the electronic ballast, form a unit. During the subsequent production process, the ballast is then programmed with luminaire-specific information, in order through this to adapt the functionality of the ballast to the luminaire type. This programming can for example be effected by burning in of corresponding information into a memory element of the ballast.

By means of the above-described measure of programming it can be ensured that the ballast can be put to use in different luminaires and suitably control different lamp types, but problems can arise from the fact that the working life and reliability of the mechanical elements of the luminaire in part is significantly higher than that of the ballast. In other words, it can indeed occur that in the course of the working life of a luminaire the ballast must be exchanged due to a defect or other manifestations of wear. In this case, however, the information programmed into the original ballast on production, is lost. Also the information programmed-in during the commissioning of the luminaire in the illumination system, for example an operating or group address valid for the illumination system for individual control, and information regarding the permissible operating time of the lighting means, are deleted upon an exchange of the ballast. From U.S. Pat. No. 6,693,397 B1 there is thus for example known a luminaire for employment in endoscopic investigations, in which an exchangeable lamp unit has a data memory for recording the operating time. When, after a predetermined overall operating time, the lamp unit, fixedly connected with the memory, is exchanged, also the memory is necessarily replaced, so that supplementary information held in the memory, which for example relates to the general operation of the luminaire, must be newly written in.

A similar problem to that described above arises in general in the case of so-called building management systems, with which a plurality of so-called actuators, arranged in a distributed manner, are controlled from a central control unit. Under the term actuator there thereby fall both the above-described elements of illumination technology, wherein also emergency light inverters, operating devices for light diodes or halogen lamps are also to be counted, as are also heating, ventilation or climate conditioning elements, and for example blinds for darkening of windows and the like. Such actuators generally have a control device which is constituted for the purpose of receiving control commands from the central control unit of the illumination or general building management system and then to operate the actuator correspondingly in dependence upon these control commands. If these actuators have been to date purely command receivers, which have been controlled from a central computer, in the meantime the tendency in increasing degree is that the actuators themselves manifest a certain intelligence and process certain programs in response to the reception of control commands. Further, increasingly bus systems of various kinds are coupled, mostly in a hierarchical manner in a building. Thus, for example, a central control unit formed by means of a computer can be connected by means of a TCP-IP bus with one or more local control units, which for their part are connected with or communicate with actuators on the basis of another bus system, for example the DALI bus employed in the illumination industry. It is further usual to couple different bus systems with one another via so-called gateways or interface modules.

Through the increase in the local "intelligence" of the actuators, although there is now provided an ever more convenient possibility for control, problems and financial risks for the provider of the actuators, and for the operator of the corresponding building management system, can also arise therefrom. These problems may make themselves noticeable as delays and cost overruns in the necessary first programming of the installation. Beyond this, a subsequent function alteration or extension of the installation is associated with in part very high programming costs. Finally, analogously to the above-indicated case, the exchange of a defective ballast gives rise to the problem that in the case of a device failure and the employment of a corresponding replacement device the originally programmed information is lost and correspondingly a new programming is needed, through which high additional costs arise.

A further problem of these modern actuators consists finally also in that, due to the multiplicity of functions and operating possibilities of these devices, the most varied causes for a possible defect come into question. Thus, a failure of a lamp operating device can for example be due to operation of the light source within a critical operating parameter region; however, it could also simply be the case that the intended operational life of the device or of the light source has in the meantime been exceeded. If now a lamp operating device or in general an actuator in fact fails, it is thus often very difficult to determine the actual cause of the failure and—so far as possible—possibly to take measures to avoid such difficulties in future.

SUMMARY OF THE INVENTION

The present invention is now based on the object of avoiding the above-described problems in the case of illumination systems or in the case of building management systems in general. Further, a possibility is to be indicated for being better able to monitor the operating condition of an actuator, in order for example to simplify the discovery of causes for possible defects of the device.

This object is achieved by means of a building management system and by means of an actuator for employment in a building management system or a lamp operating device as claimed in the appended claims.

In accordance with a first aspect of the present invention it is proposed to so configure the actuator provided for employment in the building management system, which actuator has a control device which is constituted for the purpose of receiving control commands from the central control unit and to operate the actuator in dependence upon these control commands, and also a memory part for storing function-relevant information, that the memory part is separate or separable from the control device. Through this there is opened up the possibility that the control device of the actuator, thus for example the electronic ballast of a luminaire, can be exchanged separately from the memory part, so that upon an exchange of the control device the new control device can access the information originally contained in the actuator or the luminaire. In contrast to the previously known solutions, upon the replacement of the control device, no complex new programming is needed, since the originally available information can remain as before in the actuator or the luminaire. The not insignificant costs connected with a new programming of the device can thus be avoided by means of the solution in accordance with the invention.

In a simple variant of the present invention it can be provided that the memory part is fixedly integrated in the actuator, whilst in contrast the control device can be removed separately from the memory part out of the actuator and replaced by a similar new device. Beyond this, however, it would also be conceivable to constitute the memory part also to be exchangeable, which would bring with it further advantages with regard to programming possibilities. Thus, it is usually provided that the first programming of the memory part is effected on production, i.e. before the actuator is commissioned. If however, at a later point in time, an alteration of the programming is undertaken, this can in the case of an exchangeable memory part be effected in simple manner in that the old memory part is replaced by a new part already written with the new operating information. In this case likewise the outlay for new programming of the device can be reduced, since the new memory part with the new data can already be programmed at a central location—for example at the producer of the actuators or the company responsible for the illumination or building management system—and then placed in simple manner in the corresponding actuator.

The memory parts of the actuators in accordance with the invention may both be so configured that they can only be read, and also so that they are both readable and also writeable. The first-mentioned variant is sufficient if a single programming of the actuator is sufficient or if upon a new programming of the actuators the entire memory part is to be replaced by a new one. In contrast, in the case of more complex actuators, the possibility of writing to the memory part is of advantage since through this the possibility is created for the control device still to place information in the memory part during operation. It would, for example, then be conceivable in this case that the control device permanently writes information with regard to the current operating condition of the actuator into the memory, so that for example in the case of a later defect of the actuator, it can be determine what the cause of the fault was or who—the producer of the actuator or the user—was responsible for the fault and who corresponding has to bear the costs for repair measures.

The data transfer between the memory part and the control device can be effected via plug contacts or also in wireless manner, whereby in the second case the memory part may preferably be formed by means of a so-called RFID (radio frequency identification) element. Also the employment of a so-called SIM (subscriber identity module) card as memory part would be conceivable.

Alongside the possibility of data exchange between the local control device, i.e. the control device of the actuator, and the memory part, it would also additionally be conceivable that the memory part is directly readable and/or writeable by means of the central control unit. In this case there would be available in simple manner the possibility of newly programming the actuator or the luminaire from a central location.

The above-mentioned concept of regularly detecting operating data of an actuator and storing it in a non-volatile memory, represents a second aspect of the present invention, which can be put to use independently of whether the memory can or cannot be separated from the control part. Through the regular recording of operating data in the sense of a "log" there is the possibility, also after a possible failure of the device, to obtain more detailed information on the previous operation and possibly to determine the cause of the failure of the device. Also maintenance work is significantly simplified in this manner, since for example after reading out of the information stored in the memory it can be determined whether a certain operating time has been exceeded and correspondingly whether possibly an exchange of the device should be considered. Further, there can be determined in simple manner those devices which e.g. operate a light source associated therewith outside permissible operating parameters and correspondingly should be serviced (e.g. newly calibrated) or even replaced. Here it is significant that the device self-actingly undertakes the storing of the operating data and thus self-actingly creates a log of the operation, whereby the data collected in this way can then be read out for maintenance purposes.

The reading out of the data may thereby be effected in different manners, whereby e.g. the interface connecting the actuator with the overall system may be used. Also the use of a separate interface, to which for example a diagnosis or maintenance device could be purposively connected for the readout of the stored operating data, would be conceivable. Finally, the read out of the stored information could also be effected in a wireless manner or by means of the temporary removal of the memory part.

Through this second aspect in accordance with the invention, thus in particular the possibilities for monitoring the operation of the actuator, and therewith for determining possible fault conditions, are improved.

BRIEF DESCRIPTION OF THE DRAWINGS

Below, the invention is to be described in more detail with reference to the accompanying drawings. There is shown.

DETAILED DESCRIPTION OF THE INVENTION

Before the configuration and manner of functioning of actuators configured in accordance with the invention is described in more detail, first the configuration of a more complex building management system will be explained with reference to FIG. 1. Thereby, FIG. 1 shows a more complex building management system which is provided for the control of a plurality of actuators within a larger building.

Figure 1:
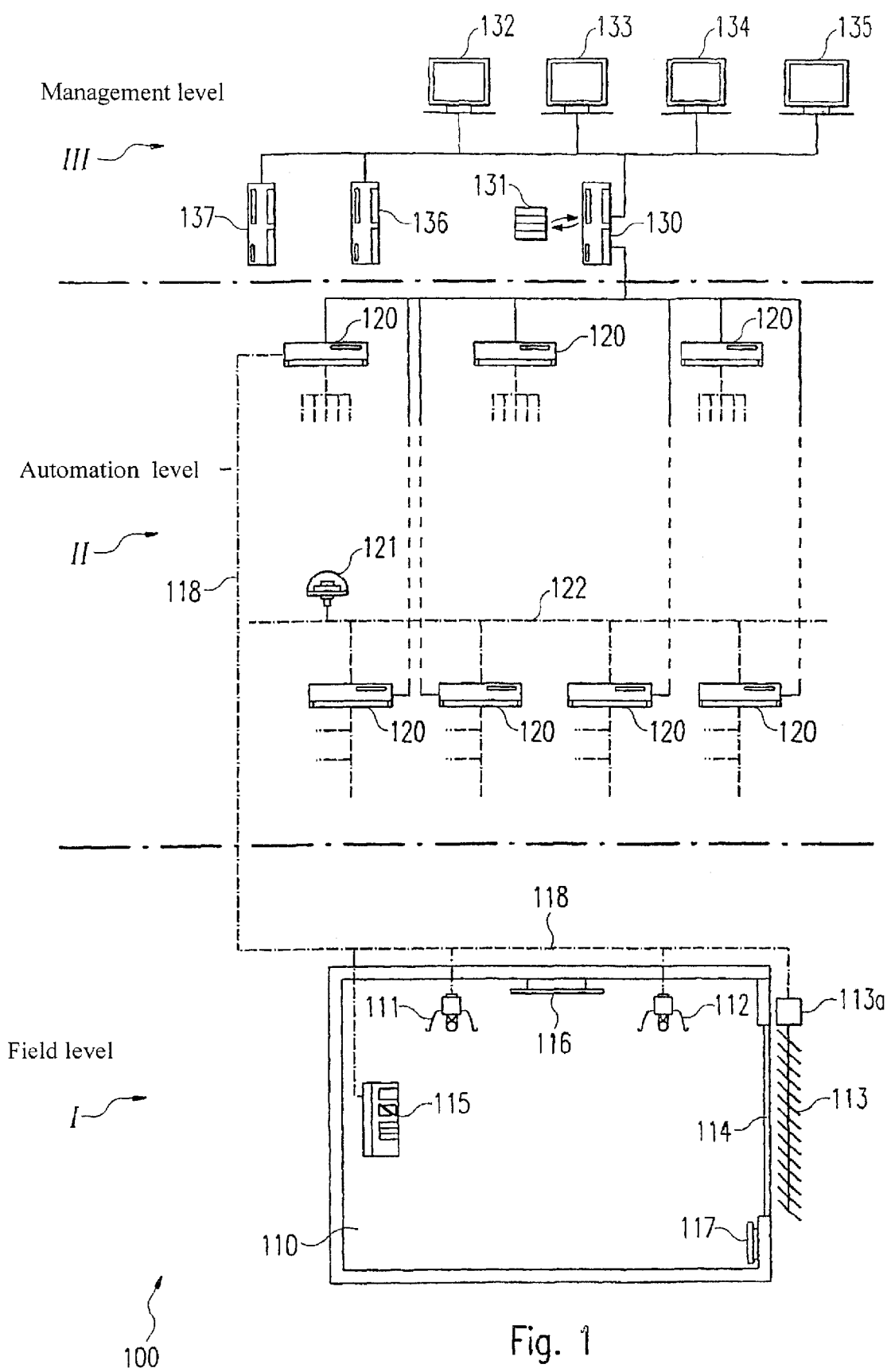
FIG. 1 the hierarchical structure of a complex building management system.

The building management system represented in FIG. 1 and provided overall with the reference sign 100, seen hierarchically, can be divided into three levels. Here there are involved in increasing sequence, the so-called field level I, the automation level II, and the management level III. The three levels thereby differ with regard to the devices therein and their manner of functioning, which is to be explained below.

In the lowest so-called field level I, there are located first primarily the actuators and the operating elements. The actuators may be for example the luminaires 111 or 112 arranged within a room 110 and further a blind 113, controlled via a corresponding motor 113a, for darkening a window 114 of the room 110. The manual control of these actuators 111 to 113 is effected locally via one or more operating devices 115, via which control commands for control of the light sources in the luminaires 110, 112 or of the blind 113 can be manually issued by the user. The actuators 111 to 113 are for this purpose connected via a common bus line 118 with the operating device 115.

Additionally, the room 110 could also be regulated in terms of its temperature locally through a climate control module, by means of an operating device, for which purpose there are additionally provided in the room also elements for cooling 116 and for heating 117. Also these two elements 116, 117 may be additionally connected to the bus line 118, in extension of the building management system, and controlled in common via the operating device 115.

A further extension of the system within the field level could also further consist in arranging sensors within the room 110 which for example determine the presence of persons in the room 110 and in this case automatically activate the luminaires 111 and 112. Also a brightness regulation taking into consideration the light incident through the window 114 could be achieved in this manner. Corresponding sensors would then in turn be connected via the bus 118 with the actuators 111 to 113.

It is to be noted further that the building management system 100 of course does not have only a single room with actuators to be controlled, but rather a plurality of such rooms. The field level 1 can thus be divided up into a plurality of so-called bus regions, wherein then a bus region forms the smallest logical unit within the system. Within a bus region input and output devices may share a common bus line and a common bus supply, whereby the bus line connects the various components with one another electrically. In the illustrated exemplary embodiment in FIG. 1, for example the room 110 can be considered as a single bus region. It would, however, also be entirely conceivable to extend a bus region to a plurality of rooms, for example to an office or an apartment within the building.

A particular feature of the building management system 100 represented in FIG. 1 is further that the bus 118 provided in the field level for connecting the input device 115 with the various actuators 110 to 113 further leads also into the, hierarchically considered, next higher automation level II and is there connected at least with one computer 120 provided in this level. As can be understood from the representation in FIG. 1, the central elements of this automation level II are a plurality of computers 120, which are so-called daylight calculators. It is the task of these daylight calculators 120 to carry out the various services of daylight automation, time automation, blind automation or also statistical monitoring and maintenance checks. Under the term "service" there can thereby be understood in general all functions of the building management system for control or operation of the actuators which go beyond a local manual control of the actuators by the user by means of the operating devices. For example, the possibility of controlling the luminaires of a room in common corresponding to a desired pre-programmed lighting mood or situation represents a service. Also the time-depended automatic switching on and switching off of the actuators falls thereunder.

A further particular service which can be realized with the aid of the automation level is the daylight dependent control of the actuators, in particular of the light sources and the blinds. A further component of the automation level II is correspondingly a daylight measurement head 121 which is provided for the detection of the intensity and the directional dependence of the exterior light. The data sent from this daylight measurement head 121 is then processed by the daylight calculators 120 and on the basis of this information corresponding control commands for control of the actuators are issued. Also in the case of carrying out of other services, control information from the daylight calculators 120 to the actuators, or return information in the opposite direction, is transmitted. Thereby it is inter alia also provided that the daylight calculators 120 communicate with one another, whereby this is, however, effected not via the bus 118 provided for the control of the actuators but via a specific bus system 122.

The highest hierarchy level of the building management system 100 is finally represented by the management level III, in which finally the connection to the general building control technology is effected. As interface for this there is provided a specific computer 130 which on the one hand is connected with the daylight calculators 120 of the automation level II and on the other hand with the various components of the management level I. A component of the interface computer 130 is further a databank 131 in which there is contained all significant information with regard to the various components of the automation level II and of the field level I.

Components of the management level III, which are connected with one another via a further specific bus system 140, are a plurality of computer units 132 to 135 for general room, blind or time management. Also program server 136 and internet/intranet server 137 may be provided in this third level.

Overall, through this there is thus provided a hierarchically arranged system, which opens up the possibilities of a central and automated control of the various actuators in the field level. At the same time there is, however, for a user also the possibility of manually controlling the actuators within a corresponding bus region by means corresponding operating devices.

Figure 2:
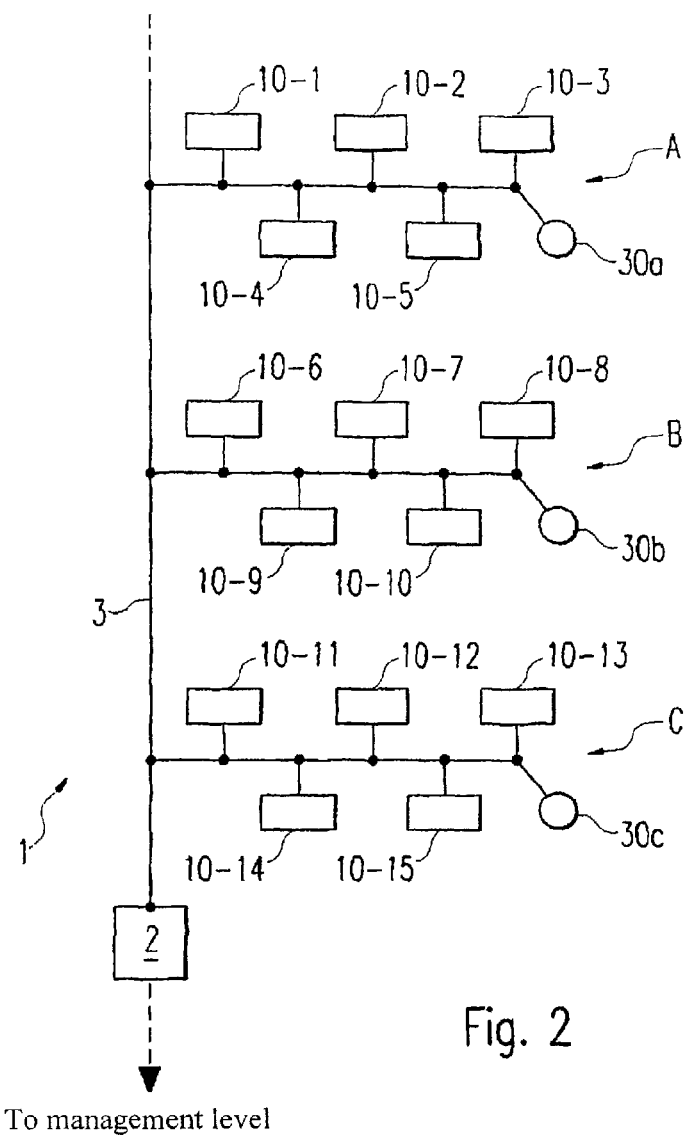
FIG. 2 the simplified schematic of a building management system, in which actuators configured in accordance with the invention are controlled by means of a central control unit.

FIG. 2 now shows schematically a simplified building management system, provided with the reference sign 1, which has a control unit 2 which is connected via a bus line system 3 with plural actuators 10-1 to 10-15 arranged in a distributed manner. The actuators 10- to 10-5 may be for example the previously mentioned elements of heating, ventilation and climate conditioning technology. Also other so-called assemblies such as blinds or luminaires could be controlled by means of the central control unit 2.

This central control unit 2 may be for example one of the previously described daylight calculators of the automation level, via which there is effected a control of the various actuators 10-1 to 10-15 in accordance with the different services. The actuators 10-1 to 10-15 are thus in turn part of the previously described field level, whilst in contrast the central control unit 2 is already part of the hierarchically higher automation level and—as indicated by the broken line—may be connected with further components for example of the management level.

It is common to all actuators 10-1 to 10-15 of the system 1 that they have internally a control device which is at least capable of receiving control commands via the data lines of the bus line system 3 and to operate the associated actuator 10-1 to 10-15 in corresponding manner. These control commands may for example be generated manually by means of a local input device 30a, 30b or 30c, in particular however they can also be transmitted from the central control unit 2. Often, the control devices of the actuators 10-1 to 10-15 are further also capable of transmitting data to the central control unit 2 and for example transmitting information concerning the current operating condition or possibly fault conditions, through which there is provided the possibility of a central monitoring of the functionality of the system.

So that the actuators 10-1 to 10-15 can be individually addressed by the central control unit 2, a specific operating address is allocated to each of them, via which they are contacted. Further, additionally, a group address could be allocated to them, in order to address at the same time a number of the actuators 10-1 to 10-15. For example, the actuators 10-1 to 10-5, 10-6 to 10-10 and 10-11 to 10-15 of regions A, B and C could be luminaires of a common bus region which are located in different rooms, so that through control of a certain group the brightness in the corresponding room can be collectively altered. It would, however, also be conceivable that the actuators in the three regions A, B and C in each case define a specific bus region.

The information concerning the operating address and, if applicable, a group address, must be programmed into the actuators 10-1 to 10-15 at the latest upon commissioning of the system. To date it was known to program in this information directly into the corresponding control device of the actuator 10-1 to 10-15; thus, in the case of a luminaire for example into the ballast which had for this purpose a suitable memory element. In the case that the ballast now had to be exchanged due to a defect, a new programming was necessary, since with removal of the old defective ballast also the operation-specific information was lost.

In order to avoid the above-mentioned disadvantage, it is now proposed in accordance with the invention to so configure the actuators 10-1 to 10-15 that upon an exchange of the control device the information remains in the actuator 10-1 to 10-15. One possibility for the realization of this solution will now be explained in more detail with reference to FIG. 3.

Figure 3:
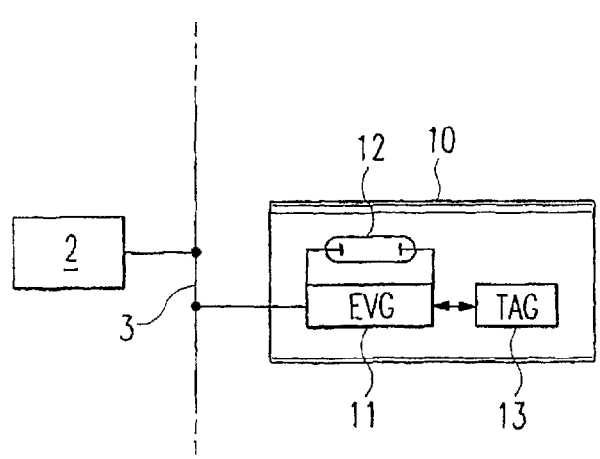
FIG. 3 the configuration of an actuator in accordance with the invention, with reference to the example of a luminaire.

FIG. 3 shows an enlarged representation of the configuration in accordance with the invention of an actuator, generally provided with the reference sign 10, on the basis of the exemplary embodiment of a luminaire. A central element of the luminaire 10 is a control device in the form of an electronic ballast 11 which with the aid of an interface, not shown in detail, is connected with the central control unit via the lines of the bus system 3 and is capable of receiving commands from the central control unit 2 and, if applicable, reporting back information concerning the operating condition of the luminaire 10 to the control unit 2. The ballast 11 controls a lamp 12, which is for example a gas discharge lamp.

Information concerning the lamp type can now be held in a memory part 13, designated as TAG, separate from the ballast 11, which memory part can be read out by the ballast 11. The information contained in the memory part 13 thereby indicates not only information concerning the lamp type employed but beyond this can also contain information with regard to the above-mentioned operating and/or group address of the luminaire 10 and other operation-specific parameters which are of significance for the functioning of the luminaire 10 in the overall system. Significant here is that the luminaire-specific information and operating parameters are stored in the memory part 13 separately from the ballast 11 serving as control device, which memory part is fixedly integrated in the luminaire 10 in the illustrated exemplary embodiment. Upon an exchange of the ballast 11, the information thus remains in the luminaire 10, so that this information is available without complex new programming of the device upon an exchange of the ballast 11. The information in the memory 13 can then immediately be read by the new ballast 11, so that this is directly placed in a position to operate the luminaire 10 in the originally desired manner. Further, the memory part 13 could also be so configured that it is writeable by means of the ballast 11, so that operating data from the ballast 11 can be copied into the memory part and there safely stored.

The ballast 11 can, in case of need, pass on all the information contained in the memory part 13 to the single control unit 2. Alternatively thereto, it could even be provided that the control unit 2 is capable of storing information directly in the memory part 13, or reading out from the memory part, without for this having to take a route via the ballast 11.

Figure 4:
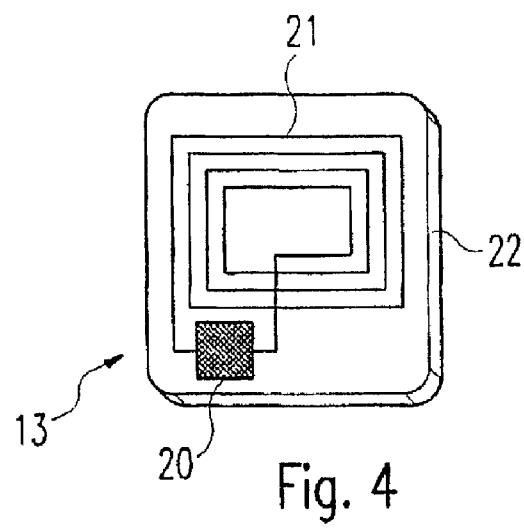
FIG. 4 a preferred exemplary embodiment of a memory part in the form of a RFID element and FIG. 5 a second exemplary embodiment of a control device in the form of an electronic ballast, which is constituted for independent recording of operating data.

For realization of the memory element 13 various possibilities are conceivable. Preferably, a so-called passive RFID tag is employed, which can be read out in a wireless manner by the ballast 11. Such RFID elements, which are often called "Smart Labels", are finding increasing use in recent times as passive memories. As the schematic illustration in FIG. 4 shows, such an RFID tag, or such a RFID transponder, consists in substance of an electronic memory in the form of a microchip 20, which is arranged in a housing 22 in common with a coil 21 serving as antenna.

The antenna 21 thereby serves not only for data reception and data transmission but also takes from the electromagnetic field coming from a corresponding writing/reading device—which is component of the control device or is connected therewith—the energy needed for the current supply of the microchip 20. This brings the advantage that RFID elements do not need their own current supply and due to the passive construction radio signals arise only during the data transfer and—due to the extremely slight transmission power—solely in the immediate vicinity. Since the coil 21 serving as antenna is further as a rule constituted as a flat coil, RFID elements can be produced in extremely thin forms and make possible due to their robustness, without need for maintenance, a passive data retention without data loss over a period of at least 10 years.

The advantage of the employment of such a RFID element 13 as memory part consists in that this can be processed in a similar way as a normal plastic or paper label and does not take up additional space in the luminaire 10. Further, the RFID element 13 can be employed through the entire logistics chain; that is, during production, storage, transportation and construction site management, for unambiguous identification of the luminaire, wherein the data stored in RFID element 13 can be put to use also later by the building management system for inventory purposes during the entire working life of the luminaire.

A further advantage of the employment of the memory part 13 results from the fact that the number of necessary variants of ballasts can be reduced, since the ballast 11 can make use of luminaire-specific parameters in the memory part 13 and thus control the associated lamp 12 in appropriate manner. In this sense it would also be conceivable so to configure the system that on the basis of a luminaire article number stored in the RFID tag 13, luminaire-specific data could be called up from a databank, which then indicates the basic conditions or parameters of luminaire operation. A fault-prone manual setting of the lamp type would thus not be needed.

In the memory part 13 there can further be stored an—unalterable—unique number which can be used by the control system to unambiguously identify the associated luminaire and control it individually. This unique number could in particular also be used during the later addressing of the luminaire within the scope of the so-called DALI standard. If the luminaire contains a plurality of ballasts, the unique number can further serve also as group number, in order to uniformly control all ballasts of this luminaire.

For changing the information contained in the memory part 13, first, the ballast 11 itself can be used, which with the aid of its write/read device is capable of writing data into the memory part 13. Also a direct programming of the RFID tag 13 by the central control unit would be conceivable in this manner. In supplement to this, it could however also be provided that the information of the memory part 13 is read and altered with the aid of a transportable write/read device. In this manner, thus also at a later time point, a reprogramming of the luminaire can still be effected, which is for example then necessary if the lamp type is changed or the luminaire is arranged at a different location of the illumination system and correspondingly the operating and/or group address must be changed.

In the case of the so far described variants it was provided that the memory part 13—that is, for example, the RFID tag—was fixedly arranged in the actuator 10 separately from the control device 11. A new programming of the luminaire could, however, additionally be simplified in that also the memory part itself is configured to be exchangeable. For example, the memory part 13 could be realized in the form of a so-called SIM card, which in simple manner can be placed by hand in corresponding insertion slot of the luminaire 10 or of the ballast 11. Significant here is that the memory part 13 can be exchanged independently of the ballast 11 and that in particular again the possibility arises of exchanging the ballast 11 without thereby having to fear a loss of the data contained in the memory element 13.

The additional exchangeability of the memory element brings, however, further advantages in handling and in the commissioning of the system, which are to be explained below.

Thus, for example, a first programming of the memory element could already be effected on manufacture, whereby all functionally relevant data of the actuator is written into the memory part by the manufacturer. If, now, a building management system is to be newly installed, initially the associated devices and actuators can be arranged and installed in suitable manner in the building, whereby then the actual commissioning of the system is effected in simple manner in that memory parts are put in place in the actuators. The outlay in terms of personnel and finance, in comparison to a local programming of each individual device, is thereby significantly reduced, since the placing of the memory parts in the corresponding insertion locations can also be carried out by less qualified maintenance personal.

An additional aspect of the exchangeable memory part consists also in that this can be used to release certain operating functions of the actuator. Thus, for example, it can be provided that the actuator or the associated control device is in principle capable of operating the actuator in different operating conditions or in accordance with different functions. These functions are, however, available for a user only then when he pays appropriate license fees therefor. Insofar as he desires this, it can be reported to the device, through the use of a correspondingly programmed memory card—or though the reprogramming of the RFID tag—that the selected functions are released and correspondingly the actuator can react in the appropriate manner. Otherwise, there could be made possible solely operation within the scope of a basic function, in which for example a luminaire can only be switched on and switched off.

Further, the memory part separate from the actuator ensures also an increased data security since—insofar as the control device has its own memory—the relevant data can be stored both in the control device and also in the memory part, so that during normal operation the control device can refer to the internally installed information but in the event of a possible data loss a rapid restoration of data can be directly effected in the actuator.

A further possibility for application for the memory part consists finally also in employing this for the permanent or regular recording of current operational conditions of the actuator or of certain events. Thus, it would for example be conceivable that the control device self-actingly writes into the memory part at certain temporal spacings, repeatedly, current information concerning the operational condition of the actuator, such as e.g. fault reports with regard to an over-voltage, over-temperature, overload etc., so that upon a failure of the device the cause of the fault condition is recognizable in a simple manner for the maintenance personnel. Along with this more general operating information, in the case that the actuator or the control device is an electronic ballast for operating a gas discharge lamp, in particular also the storage of information with regard to the date of the first operation, the operating duration, the kind or number of faults arising (e.g. over-voltage, gas defect, end of the permissible operating life, coil failure), the minimum and maximum temperatures and the number of switching processes would also be sensible.

Significant here is that the logging or storing of this information is effected self-actingly by the device. Thereby, the logging can be effected in accordance with a predetermined time scheme, whereby at certain time points information concerning the current operation is recorded. Appropriate reference time points for this could thereby definitely also be predetermined by means of the central device of the system. Alternatively or additionally to this, the storage of the operating information could however also be effected in an event controlled manner. Upon the occurrence of a certain event, for example the appearance of a fault or also simply the switching on or switching off of the light source, corresponding information concerning this is then stored in the memory, so that a complete log of the operation of the device in the course of time is produced.

Through this use of the memory part as a "log" the actuator thus self-actingly produces a complete record of its use, whereby the information produced can be read out and evaluated for servicing purposes. Of course, this possibility would also be available in the case of memory part fixedly installed in the actuator.

Figure 5:
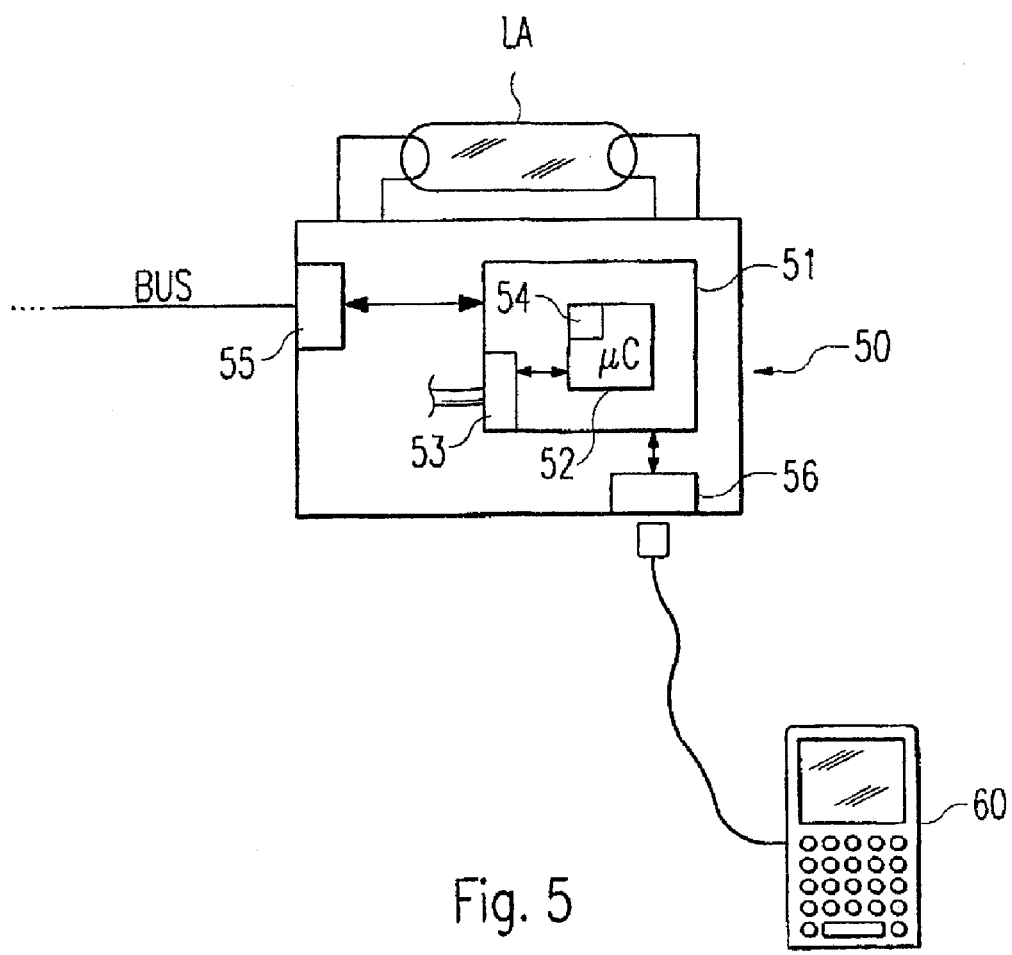

The detection of the operating data is preferably effected via a microprocessor, which is a component of internal control circuit of the control device. In this regard FIG. 5 shows a variant of a control device configured in accordance with the invention in the form of an electronic ballast 50, which has a control circuit 51 which is responsible for the operation of the light source LA and for this purpose monitors and controls the further components (not illustrated in detail) of the ballast 50. The microprocessor μC 52 located within the control circuit 51 is connected with a suitable analog interface 53 which is used for the detection of the operating data. Within the microprocessor 52 there is a flash memory 54 or an EPROM, in which the collected operating data is stored. During the operation of the ballast 50 the microprocessor 52 then regularly records information regarding the current operation; further also certain operating events such as for example the switching on or ignition of the gas discharge lamp LA and the like are logged in order to be able to determine how frequently the lamp LA was switched on or how long it has been operated. Along with information regarding the operation of the ballast 50 itself, thus also information with regard to the use of the gas discharge lamp LA can be detected.

In order now to determine more detailed information with regard to the use of the ballast 50, the information stored in the memory can be read out. A first possibility in this respect would be to use an interface 55 arranged in the ballast 50, via which this is connected with the general bus system. If this is for example a bus system in accordance with the DALI standard, the DALI interface 55 already present in the ballast 50 could be used.

An alternative possibility in this respect would, however, also be to put to use a separate—for example serial—interface 56 to which a device 110 for reading out the logged operating data can be purposively connected. For example it would then be conceivable that the maintenance personnel connect a corresponding reading device 60 to the ballast 50 in order to read out the data. Also a wireless transfer of the recorded data would be conceivable, whereby then an appropriate transmission and reception device would have to be provided in the ballast 50. The two last-mentioned variants are in particular expedient if e.g. the ballast 50 is to be analyzed after failure of the DALI interface, in order to discover the cause of the fault. The reading out of the data can in principle be effected in any operating condition (for example during pre-heating, during normal operation or during stand-by operation), without the functionality of the device being affected.

If the reading out of the data is to be effected via the DALI interface 55, for this purpose there can be put to use usual DALI controllers which are connected to the bus system. In this case it would be possible to release the ballasts, arranged in a distributed manner, for the querying of operating data by means of an authorization code.

Through the regular recording of the operating data, thus not only is the servicing of the device simplified, but beyond this there is also the possibility of determining what the cause of a possible fault was or who was responsible for the fault and correspondingly has to bear the costs of the maintenance work. In particular the discovery of the cause of the fault is significantly simplified by means of the measure according to the invention, since on the basis of the information made available possible fault conditions can be recognized in simple manner.

Attention is also directed to the fact that the self-acting recording of operating data by the actuator or the ballast is also then expedient when a stand-alone device is involved, which thus works independently and is not connected to a larger building management system. Also in the case of such independently working electronic ballasts or general lamp operating devices, through the regular recording of the operating data, the possibilities for maintenance of the device are improved. The storing of the operating data may thereby be effected both in an exchangeable memory part and also in a memory fixedly arranged in the device.

Seen overall, there is thus provided through the present invention the possibility of exchanging control devices of an actuator in simple manner without thereby having to fear a loss of operation-specific data, Through this not only is the servicing of the device simplified but at the same time also the possibility provided of altering or selectively making usable the functional capabilities of the actuator in comfortable manner. Further, through the self-acting logging of operating data, the possibility for maintenance of the devices and for fault diagnosis are decisively improved.

The invention claimed is:

1. A building management system (1) for the control of actuators (10) arranged in a distributed manner, having a central control unit (2) and at least one actuator (10) controlled by the central control unit (2), wherein the actuator (10) has
a control device (11) which is formed to receive control commands from the central control unit (2) and to operate the actuator (10) in dependence upon these control commands, and
a memory part (13) for storing function-relevant information,
and wherein the memory part (13) is separate or separable from the control device (11) wherein,
the memory part (13) is constituted by an exchangeable memory element and in that the actuator (10) or the control device (11) has an insertion location for the exchangeable memory element.

2. A building management system according to claim 1, wherein the memory part (13) can be only be read by the control device (11).

3. A building management system according to claim 2, wherein the control device (11) has a reading device or a write/read device, or is connected with such a device.

4. A building management system according to claim 2, wherein the data transfer between the memory part (13) and the control device (11) is effected in a wireless manner.

5. A building management system according to claim 4, wherein the memory part (13) is formed by a RFID element.

6. A building management system according to claim 1, wherein the memory part (13) can both be read and also written by the control device (11).

7. A building management system according to claim 6, wherein the control device (11) is constituted to independently detect or record operating data of the actuator (10) and to store the data in the memory part (13).

8. A building management system according to claim 7, wherein the recording of the operating data is effected regularly.

9. A building management system according to claim 7, wherein the recording of the operating data is effected in dependence upon certain operational events.

10. A building management system according to claim 1, wherein the memory part (13) is formed by a SIM card.

11. A building management system according to claim 1, wherein the memory part (13) is readable and/or writeable by the central control unit (2).

12. A building management system according to claim 1, wherein the actuator is a luminaire (10) of an illumination system.

13. A building management system according to claim 12, wherein the control device is formed by an electronic ballast (11) for operating a lamp, in particular a gas discharge lamp (LA).

14. A building management system (1) for the control of actuators (10) arranged in a distributed manner, having a central control unit (2) and at least one actuator (10) controlled by the central control unit (2), wherein the actuator (10) has
a control device (11) which is formed to receive control commands from the central control unit (2) and to operate the actuator (10) in dependence upon these control commands, and
a memory part (13) for storing function-relevant information,
and wherein the memory part (13) is separate or separable from the control device (11) wherein, the data transfer between the memory part (13) and the control device (11) is effected in a wireless manner and that the memory part (13) is formed by a RFID element.

15. An actuator (10) for use in a building management system (1), wherein the actuator (10) has
   a control device (11) which is formed to receive control commands from a central control unit (2) of the building management system (1) and to operate the actuator (10) in dependence upon these control commands, and
   a memory part (13) for storing function-relevant information,
   and wherein the memory part (13) is separate or separable from the control device (11) wherein,
   the memory part (13) is constituted by an exchangeable memory element and in that the actuator (10) or the control device (11) has an insertion location for the exchangeable memory element.

16. An actuator according to claim 15, wherein the memory part (13) can be only be read by the control device (11).

17. An actuator according to claim 16, wherein the control device (11) has a reading device or a write/read device, or is connected with such a device.

18. An actuator according to claim 15, wherein the memory part (13) can both be read and also written by the control device (11).

19. An actuator according to claim 18, wherein the control device (11) is constituted to independently detect or record operating data of the actuator (10) and to store the data in the memory part (13).

20. An actuator according to claim 19, wherein the recording of the operating data is affected regularly.

21. An actuator according to claim 19, wherein the recording of the operating data is effected in dependence upon certain operational events.

22. An actuator according to claim 15, wherein the data transfer between the memory part (13) and the control device (11) is effected in a wireless manner.

23. An actuator according to claim 22, wherein the memory part (13) is formed by a RFID element.

24. An actuator according to claim 15, wherein the memory part (13) is formed by a SIM card.

25. An actuator according to claim 15, wherein the actuator is a luminaire (10).

26. An actuator according to claim 25, wherein the control device is formed by an electronic ballast (11) for operating a lamp, in particular a gas discharge lamp (LA).

27. An actuator (10) for use in a building management system (1), wherein the actuator (10) has
   a control device (11) which is formed to receive control commands from a central control unit (2) of the building management system (1) and to operate the actuator (10) in dependence upon these control commands, and
   a memory part (13) for storing function-relevant information,
   and wherein the memory part (13) is separate or separable from the control device (11) wherein,
   the data transfer between the memory part (13) and the control device (11) is effected in a wireless manner and that the memory part (13) is formed by a RFID element.

* * * * *